US011510527B1

(12) United States Patent
Sikes

(10) Patent No.: US 11,510,527 B1
(45) Date of Patent: Nov. 29, 2022

(54) FIREPLACE GRILL INSERT ASSEMBLIES

(71) Applicant: Grover C. Sikes, Minden, LA (US)

(72) Inventor: Grover C. Sikes, Minden, LA (US)

( * ) Notice: Subject to any disclaimer, the term of this patent is extended or adjusted under 35 U.S.C. 154(b) by 0 days.

(21) Appl. No.: 17/747,111

(22) Filed: May 18, 2022

(51) Int. Cl.
*A47J 37/07* (2006.01)

(52) U.S. Cl.
CPC ....... *A47J 37/0772* (2013.01); *A47J 37/0786* (2013.01); *A47J 2037/0795* (2013.01)

(58) Field of Classification Search
CPC ........ A37J 37/06; A37J 37/07; A37J 37/0704; A37J 37/0718; A37J 37/0745; A37J 37/0763; A37J 37/0772; A37J 37/0786; A47J 2037/0777; A47J 2037/0795; F24B 1/182; F24B 1/202; F24B 1/205
USPC ....................................... 126/25 A, 500, 506
See application file for complete search history.

(56) References Cited

U.S. PATENT DOCUMENTS

| | | | | |
|---|---|---|---|---|
| 2,629,315 | A * | 2/1953 | Schaar | F24B 1/182 126/30 |
| 2,960,979 | A * | 11/1960 | Stone | A47J 37/0772 126/30 |
| 3,111,123 | A * | 11/1963 | Edmond | F24B 1/182 126/506 |
| 3,139,882 | A * | 7/1964 | White | F24B 1/182 126/506 |
| 3,162,113 | A * | 12/1964 | Tallaksen | A47J 37/0763 126/30 |
| 3,311,105 | A | 3/1967 | Bergel et al. | |
| 3,391,685 | A | 7/1968 | Lemmons et al. | |
| 3,834,370 | A | 9/1974 | Nelson | |
| 4,054,123 | A | 10/1977 | Corter | |
| 4,437,450 | A | 3/1984 | Connelly | |
| 4,532,912 | A | 8/1985 | Burnside | |
| 4,766,879 | A | 8/1988 | Freese | |
| 4,911,146 | A | 3/1990 | Pushee | |
| 5,307,797 | A | 5/1994 | Kleefeld | |
| 6,070,571 | A | 6/2000 | Bradbury | |
| 6,321,741 | B1 * | 11/2001 | Thompson | A47J 37/0772 126/25 A |
| 6,532,951 | B1 | 3/2003 | Sallie et al. | |
| 6,895,958 | B1 * | 5/2005 | Komosky | F24B 1/182 126/506 |
| 9,763,539 | B2 | 9/2017 | Robles | |

* cited by examiner

*Primary Examiner* — Hung D Nguyen
(74) *Attorney, Agent, or Firm* — R. Keith Harrison

(57) ABSTRACT

Fireplace grill insert assemblies suitable for deployment in a fireplace having a fireplace interior and a fireplace frame having a bottom frame panel in the fireplace interior may include an insert assembly frame. At least one grill panel may be supported by the insert assembly frame. At least one frame securing assembly may be provided on the insert assembly frame. The at least one frame securing assembly may be configured to facilitate detachable securement of the insert assembly frame to the bottom frame panel of the fireplace frame and cantilevered support of the insert assembly frame in the fireplace interior of the fireplace as one or more food items are cooked on the grill panel over a fire in the fireplace interior.

17 Claims, 13 Drawing Sheets

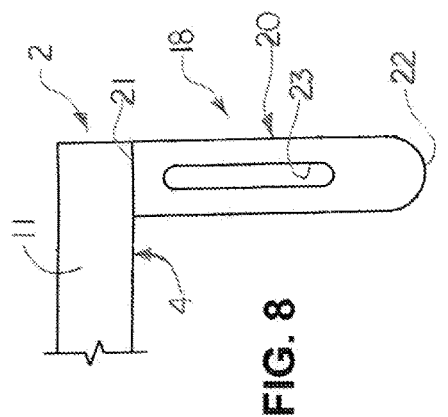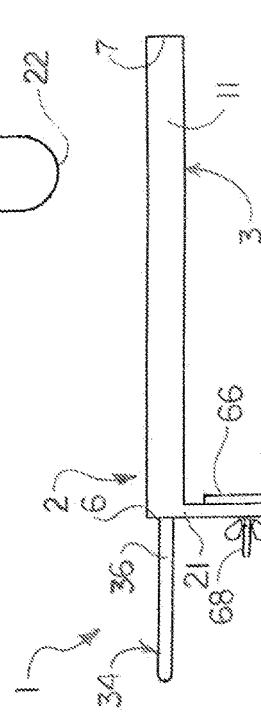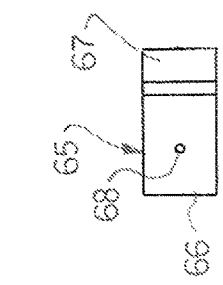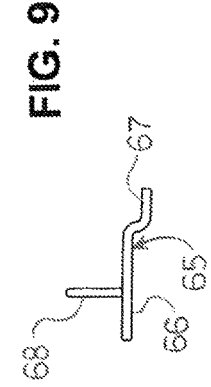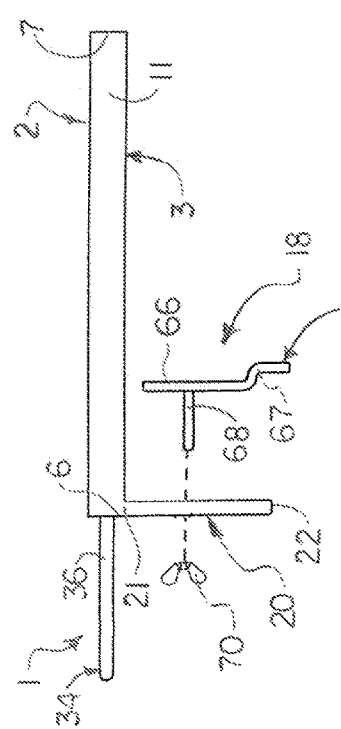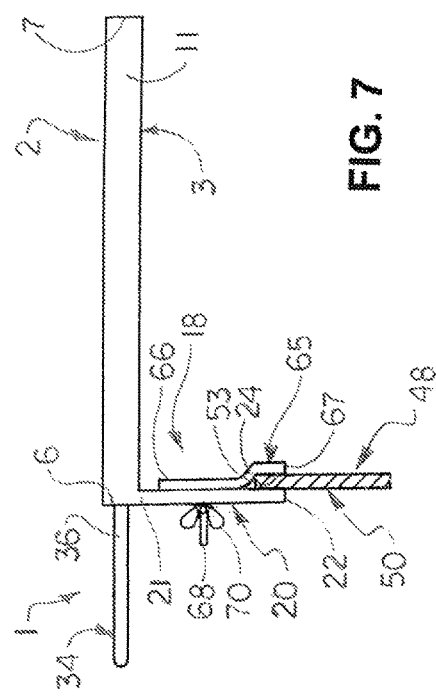

FIREPLACE GRILL INSERT ASSEMBLIES

FIELD

Illustrative embodiments of the disclosure generally relate to cooking grills. More particularly, illustrative embodiments of the disclosure relate to fireplace grill insert assemblies which can be deployed in a fireplace to provide a cooking surface for grilling or cooking foods and removed from the fireplace when not in use.

SUMMARY

Illustrative embodiments of the disclosure are generally directed to fireplace grill insert assemblies suitable for deployment in a fireplace having a fireplace interior and a fireplace frame having a bottom frame panel in the fireplace interior. An illustrative embodiment of the fireplace grill insert assembly may include an insert assembly frame. At least one grill panel may be supported by the insert assembly frame. At least one frame securing assembly may be provided on the insert assembly frame. The at least one frame securing assembly may be configured to facilitate detachable securement of the insert assembly frame to the bottom frame panel of the fireplace frame and cantilevered support of the insert assembly frame in the fireplace interior of the fireplace as one or more food items are cooked on the grill panel over a fire in the fireplace interior.

BRIEF DESCRIPTION OF THE DRAWINGS

Illustrative embodiments of the disclosure will now be described, by way of example, with reference to the accompanying drawings, in which:

FIG. 5 is an exploded side view of the illustrative fireplace grill insert assembly, more particularly illustrating typical attachment of a frame clip to a frame leg of a frame securing assembly suitable for mounting the assembly to a bottom hearth panel in a fireplace:

FIG. 6 is an exploded side view of the illustrative fireplace grill insert assembly, more particularly illustrating typical mounting of the assembly on the bottom hearth panel via the frame securing assembly;

FIG. 7 is a side view of the illustrative fireplace grill insert assembly, mounted on the bottom hearth panel of the fireplace via the frame securing assembly;

FIG. 8 is a front view of a typical frame leg of the frame securing assembly, extending from a rear frame member of the insert assembly frame;

FIG. 9 is a rear view of a typical frame clip of the frame securing assembly;

FIG. 10 is a side view of the frame clip illustrated in FIG. 9;

DETAILED DESCRIPTION

Figure 1:
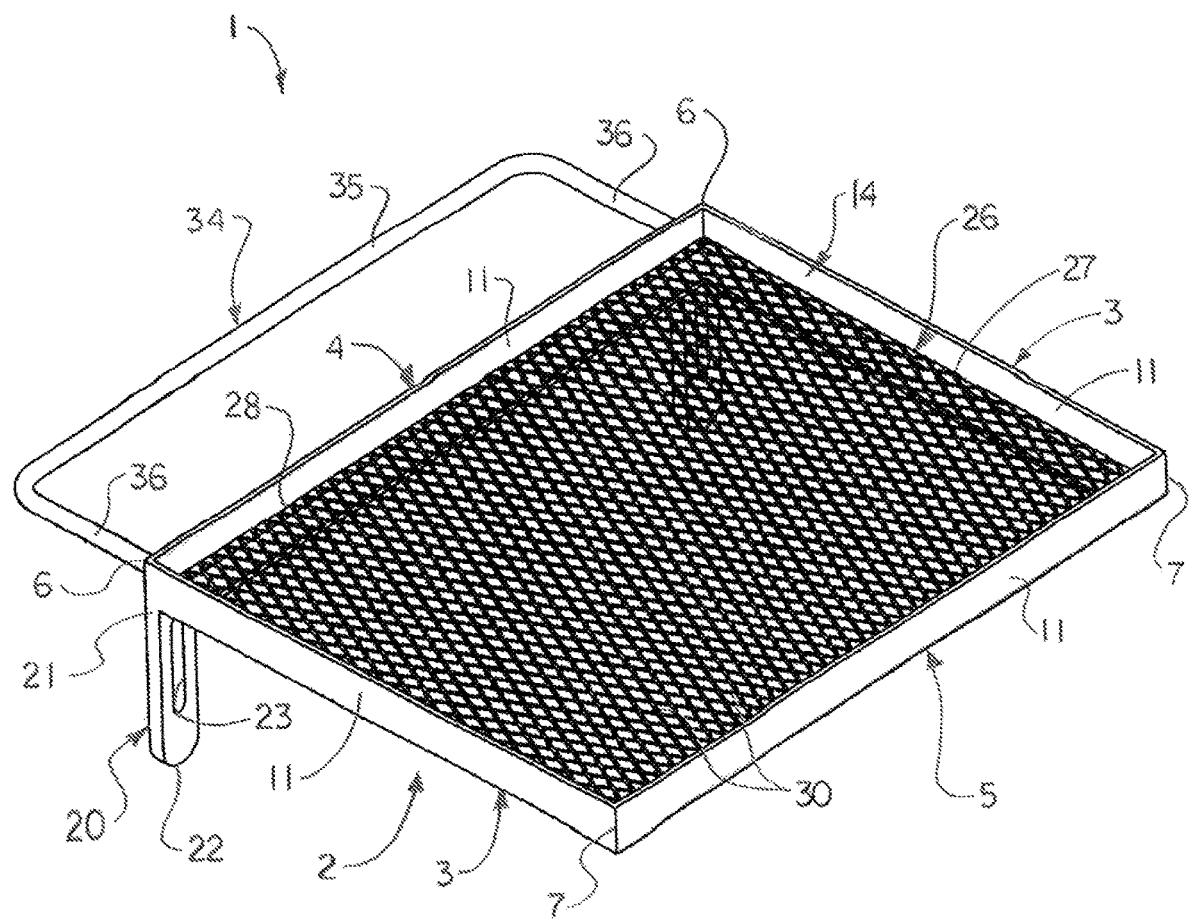
FIG. 1 is a front perspective view of an illustrative embodiment of the fireplace grill insert assemblies.
Figure 2:
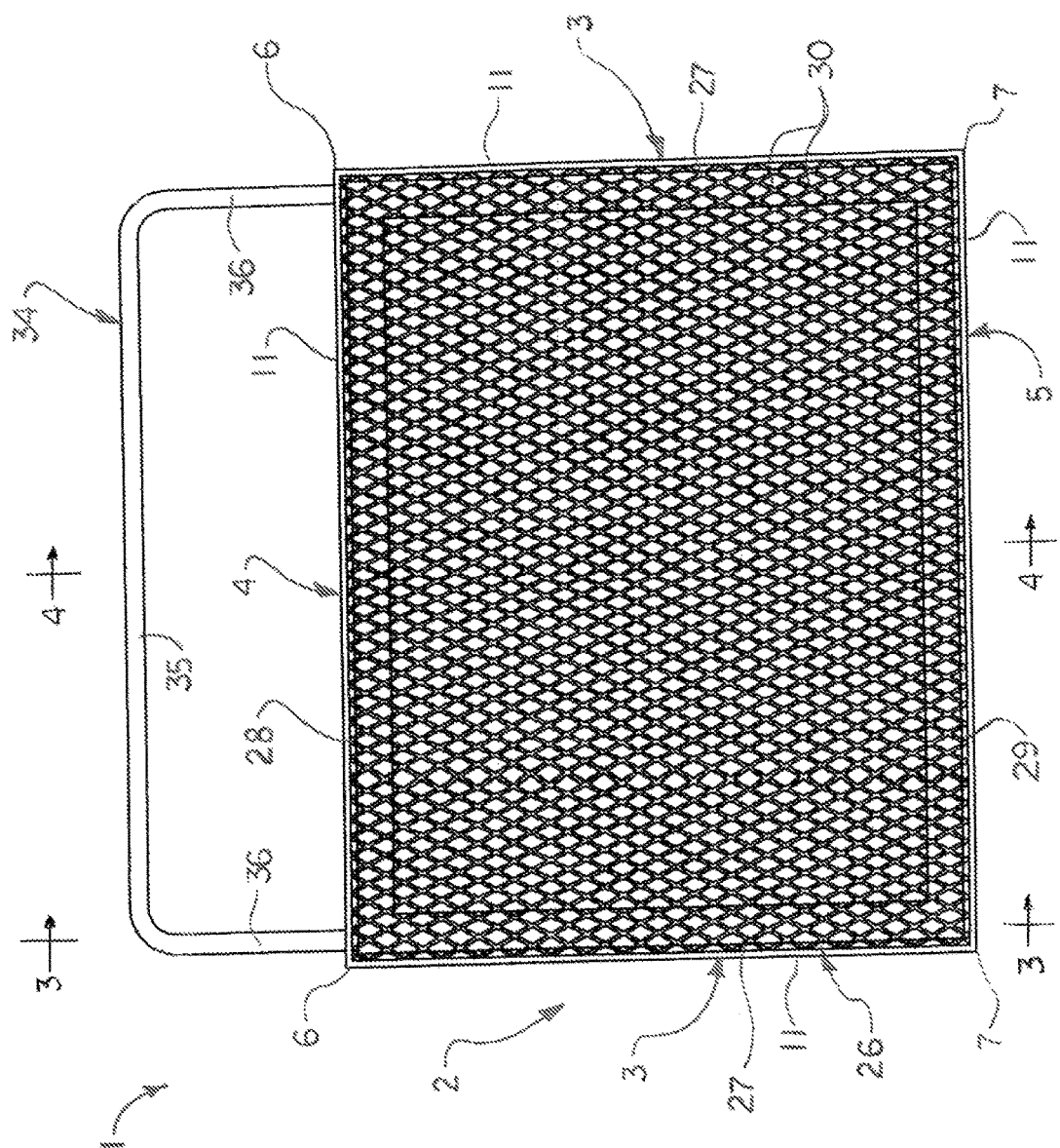
FIG. 2 is a top view of the illustrative fireplace grill insert assembly illustrated in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right". "front", "vertical". "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-14 of the drawings, an illustrative embodiment of the fireplace grill insert assemblies, hereinafter assembly, is generally indicated by reference numeral 1. As illustrated in FIGS. 11-14 and will be hereinafter further described, in typical application, the assembly 1 may be removably deployed in a fireplace interior 41 of a fireplace 40 to support one or more food items 58 (FIG. 11) as the food items 58 are grilled or cooked over a fire 60 in the fireplace interior 41. When cooking of the food items 58 is completed, the assembly 1 may be selectively and easily removed from the fireplace interior 41 as the food items 58 typically remain thereon for subsequent removal of the cooked food items 58 from the assembly 1 for consumption. Alternatively, the assembly 1 may remain in place in the fireplace interior 41 of the fireplace 40 as the cooked food items 58 are removed therefrom, and/or between uses of the assembly 1. The assembly 1 may be deployed in the fireplace interior 41 of the fireplace 40 without modification to the fireplace 40 or associated structures. As used herein, "fireplace" includes but is not limited to a brick fireplace which is built into an interior or exterior wall 38 of a home, business or other building or structure, a wood-burning stove and/or other enclosure which contains a fire.

Figure 14:
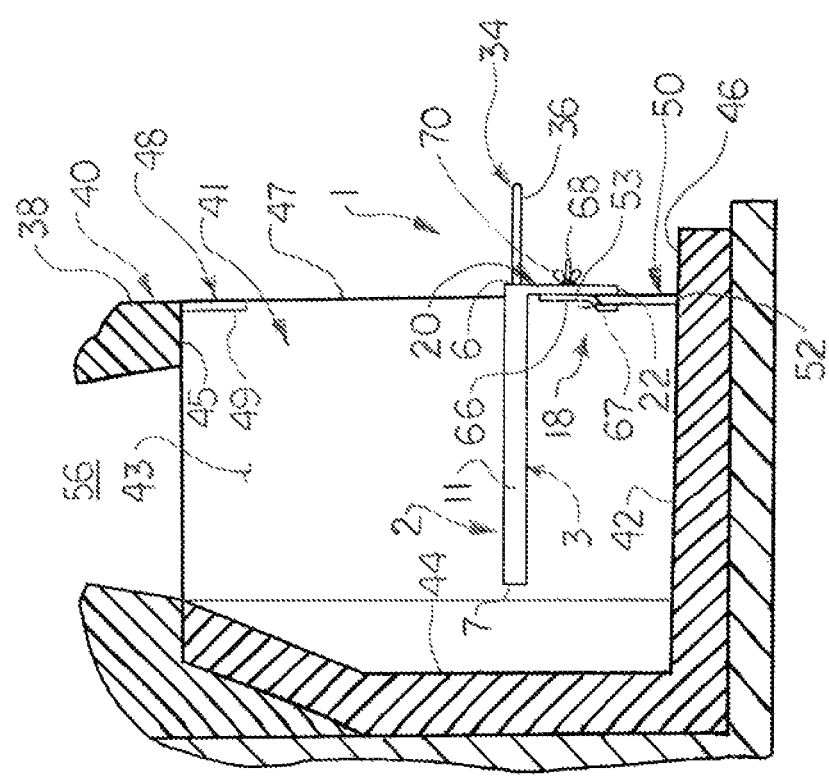
FIG. 14 is a side view of thee illustrative fireplace grill insert assembly deployed in the fireplace (illustrated in section)
Figure 15:
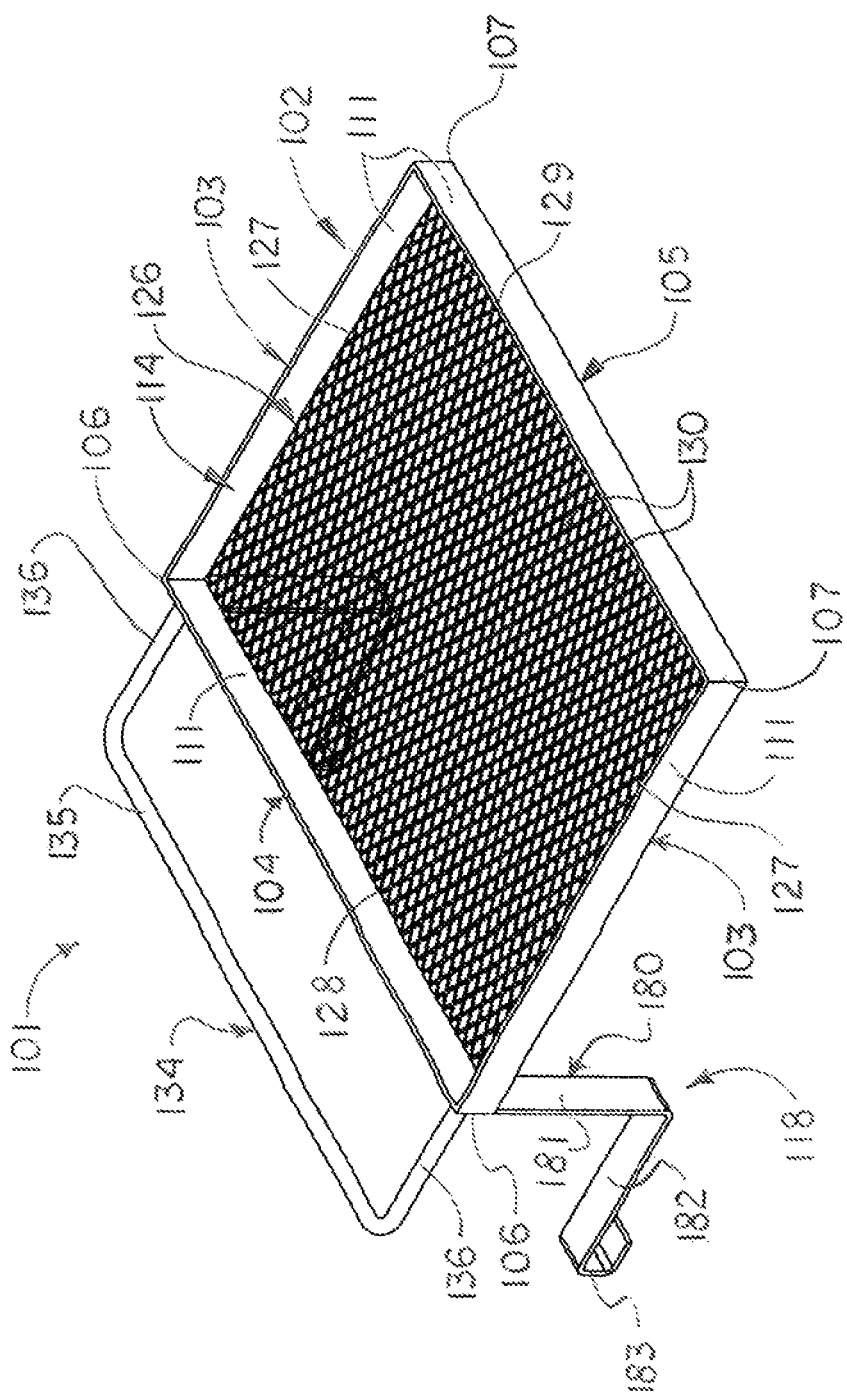
FIG. 15 is a rear perspective view of an alternative illustrative embodiment of the fireplace grill insert assemblies having an alternative frame securing assembly suitable for mounting the assembly on the bottom hearth panel of the fireplace.
Figure 16:
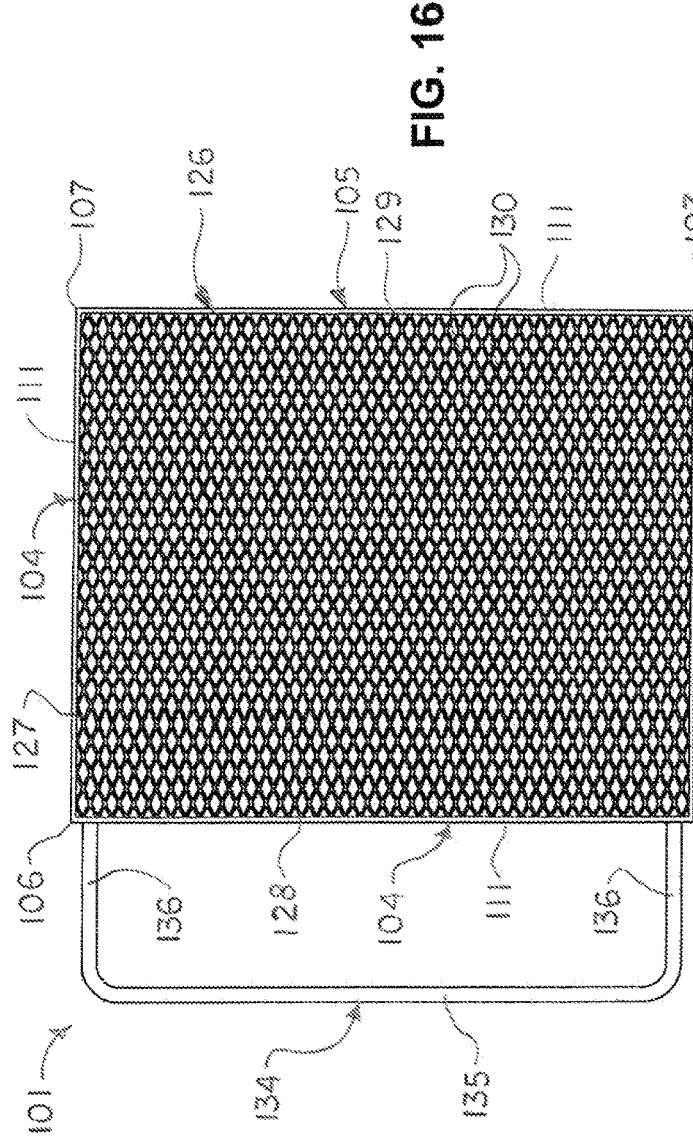
FIG. 16 is a top view of the illustrative fireplace grill insert assembly illustrated in FIG. 15.
Figure 17:
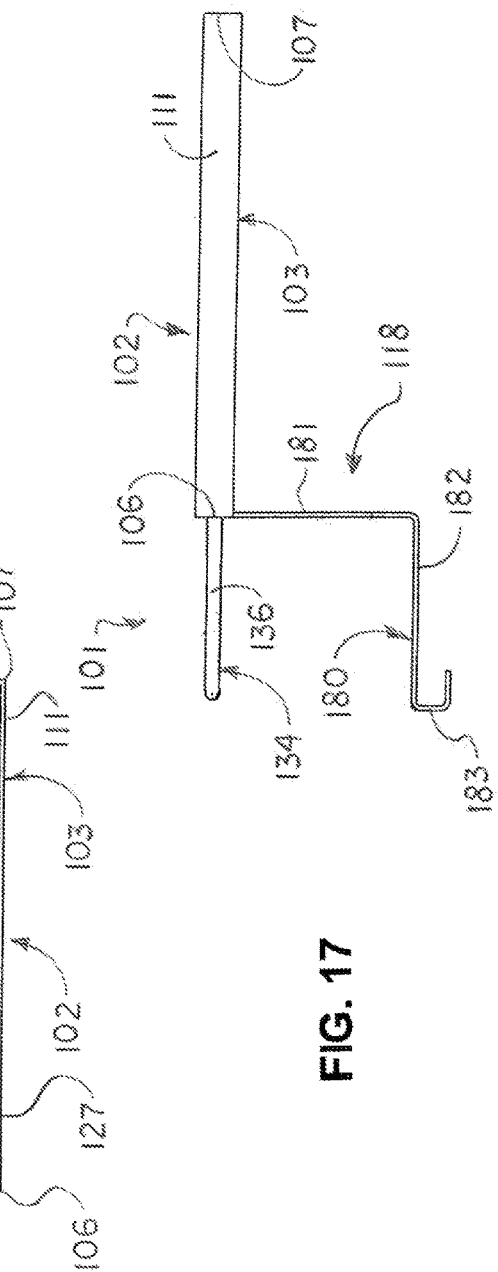
FIG. 17 is a side view of the illustrative fireplace grill insert assembly illustrated in FIG. 15.

In some applications, the fireplace 40 may have a conventional fireplace design with a fireplace floor 42. A pair of spaced-apart fireplace sidewalls 43 may extend upwardly from the fireplace floor 42. A fireplace rear wall 44 may extend upwardly from the fireplace floor 42 between the fireplace sidewalls 43. The fireplace interior 41 may have a front fireplace opening 47. A fireplace hearth 46 may extend forwardly from the fireplace floor 42 beyond the front fireplace opening 47. As illustrated in FIG. 14, a fireplace ceiling 45 having a flue opening 56 may extend over the fireplace interior 41. A fireplace frame 48 may be disposed at the front fireplace opening 47. The fireplace frame 48 may have a bottom frame panel 50 which extends between the fireplace sidewalls 43 at the front fireplace opening 47. The bottom frame panel 50 of the fireplace frame 48 may have side panel edges 51 at the respective fireplace sidewalls 43 and a lower panel edge 52 and an upper panel edge 53 which extend between the side panel edges 51.

In some applications, the fireplace frame 48 may include a top frame panel 49 which extends along the fireplace ceiling 45 at the front fireplace opening 47. The top frame panel 49 and the bottom frame panel 50 may cooperate to support a fireplace screen (not illustrated) which can be selectively deployed to open and close the front fireplace opening 47, typically in the conventional manner.

The assembly 1 may include an insert assembly frame 2. In some embodiments, the insert assembly frame 2 may be rectangular. Accordingly, as illustrated in FIGS. 1-4, the insert assembly frame 2 may have a rear frame member 4 and a front frame member 5 spaced-apart from the rear frame member 4. In some embodiments, a pair of spaced-apart side frame members 3 may extend between the rear frame member 4 and the front frame member 5 of the insert assembly frame 2. The rear frame member 4 may join the side frame members 3 at a respective pair of rear frame corners 6. The front frame member 5 may join the side frame members 3 at a respective pair of front frame corners 7. In other embodiments, the insert assembly frame 2 may be circular or elliptical or may have any other polygonal or non-polygonal shape.

At least one grill panel 26 may be supported by the insert assembly frame 2. In some embodiments, the grill panel 26 may include at least one expanded metal mesh panel having mesh openings 30, as illustrated. In some embodiments, the grill panel 26 may include at least one solid panel, for example and without limitation. In various embodiments, the grill panel 26 may include combinations of expanded metal mesh panels and solid panels depending typically on the types of food items 58 being cooked as well as the desired cooking technique which is to be applied to the food items 58.

In some embodiments, the grill panel 26 may have a rectangular shape which corresponds to the rectangular shape of the insert assembly frame 2. The grill panel 26 may thus have a pair of side grill panel edges 27 which engage the respective side frame members 3 and a rear grill panel edge 28 and a front grill panel edge 29 which engage the respective rear frame member 4 and front frame member 5 of the insert assembly frame 2.

At least one, and typically, a pair of frame securing assemblies 18 may be provided on the insert assembly frame 2. Each frame securing assembly 18 may be configured to facilitate detachable securement of the insert assembly frame 2 to the bottom frame panel 50 of the fireplace frame 48. The frame securing assemblies 18 may support the insert assembly frame 2 and the grill panel 26 thereon in a cantilever configuration over the fireplace floor 42 as the insert assembly frame 2 protrudes into the fireplace interior 41 of the fireplace 40, typically as will be hereinafter described.

In some embodiments, at least one insert assembly handle 34 may extend from the insert assembly frame 2. The insert assembly handle 34 may include an elongated main handle segment 35 which extends in adjacent, spaced-apart relationship to the rear frame member 4. A pair of spaced-apart side handle segments 36 may extend from the rear frame member 4. The main handle segment 35 may extend between the side handle segments 36.

Figure 3:
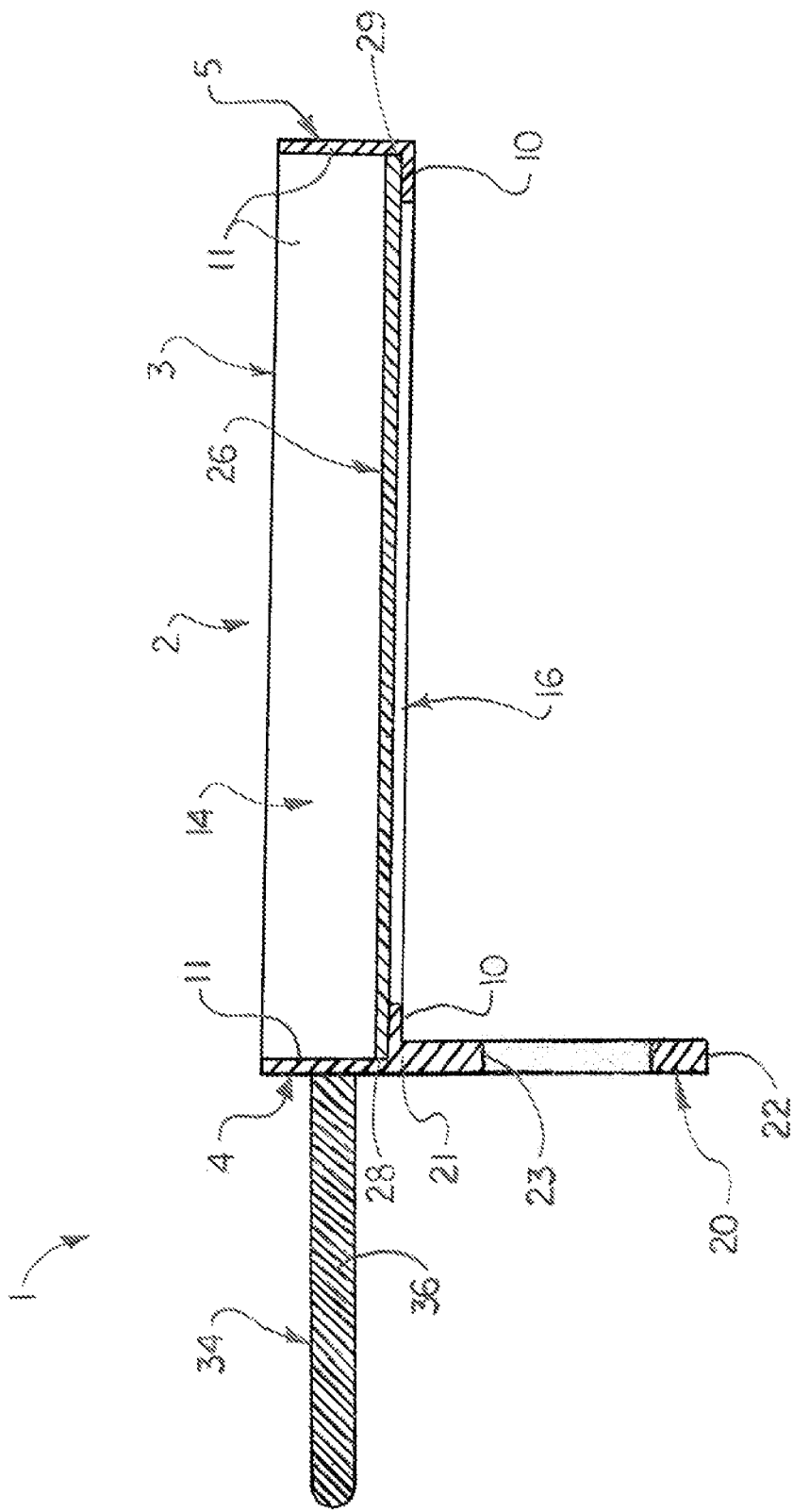
FIG. 3 is a cross-sectional view of the illustrative fireplace grill insert assembly, taken along section lines 3-3 in FIG. 2.
Figure 4:
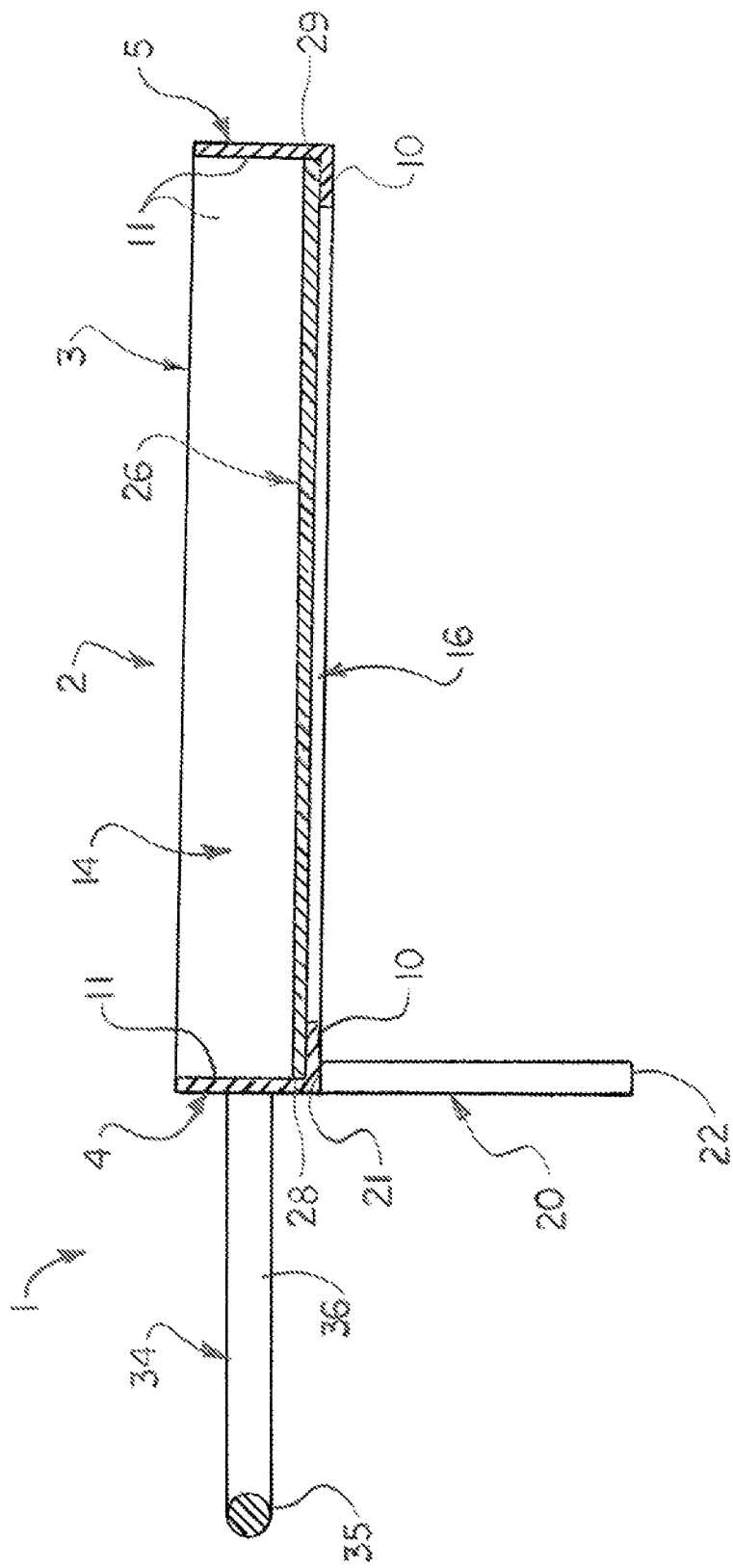
FIG. 4 is a cross-sectional view of the illustrative fireplace grill insert assembly, taken along section lines 4-4 in FIG. 2.
Figure 11:
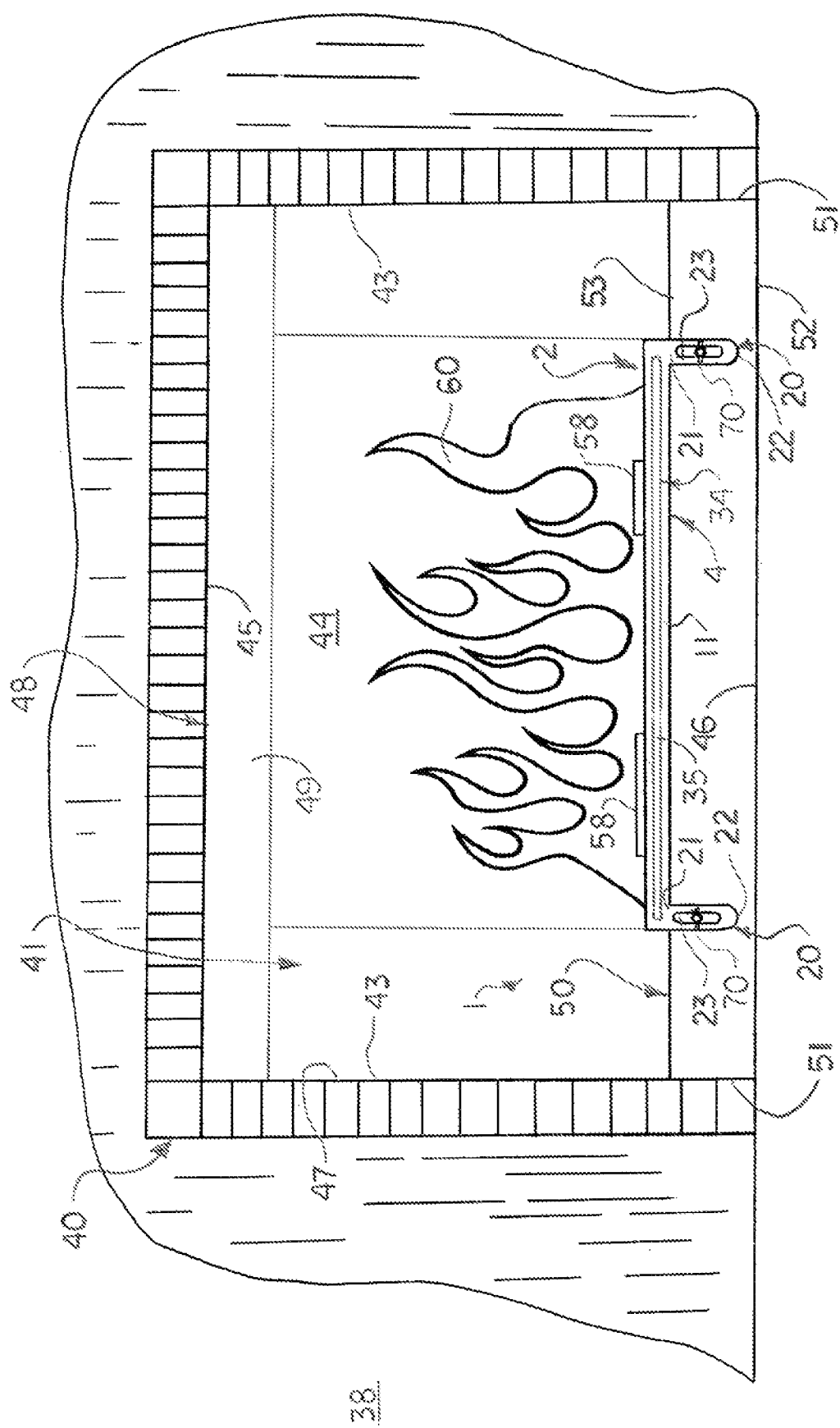
FIG. 11 is a front view of a fireplace with the illustrative fireplace grill insert assembly deployed in place in the fireplace in typical application of the assembly.
Figure 12:
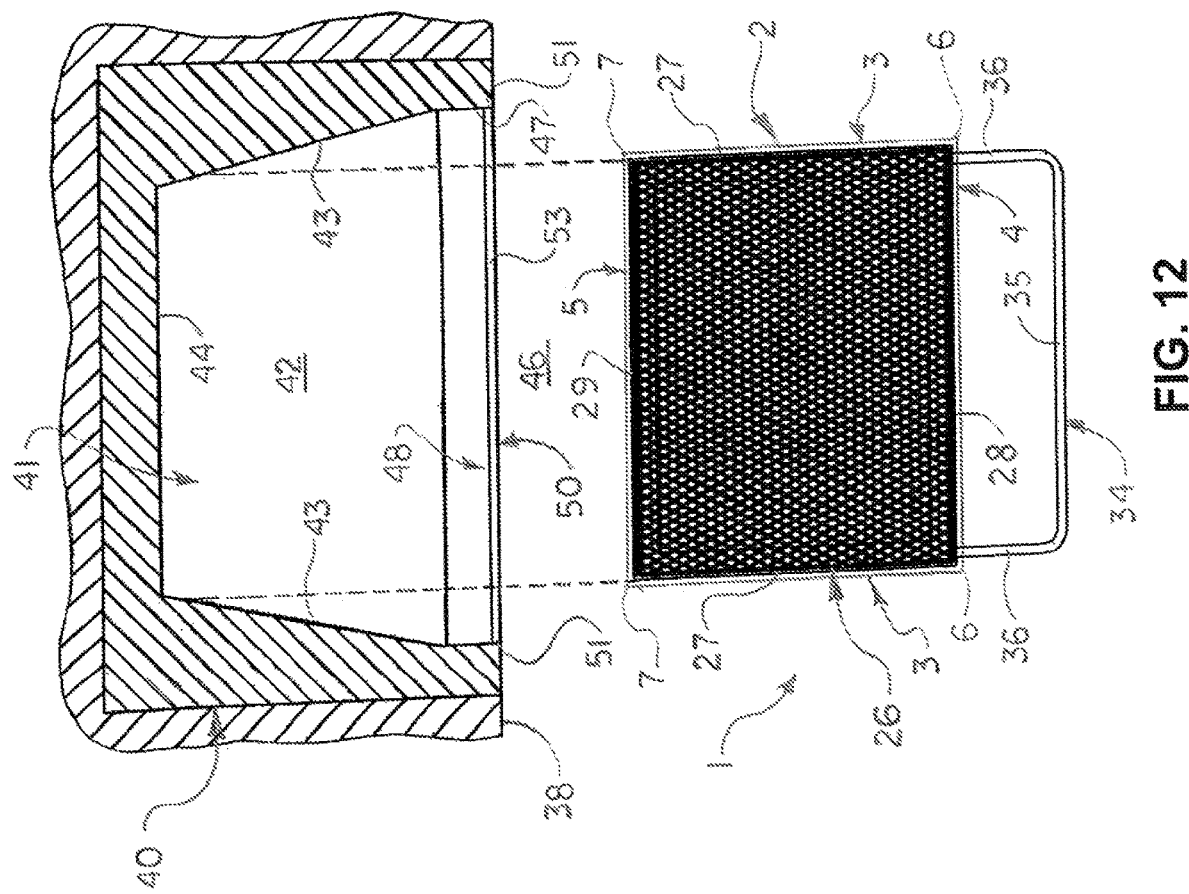
FIG. 12 is a top view of the illustrative fireplace grill insert assembly, more particularly illustrating typical placement of the assembly into the fireplace (illustrated in section)

As illustrated in FIGS. 3 and 4, each of the side frame members 3, the rear frame member 4 and the front frame member 5 of the insert assembly frame 2 may have an L-shaped configuration in cross-section with a base frame element 10 and an upright frame element 11 which extends from the base frame element 10 in perpendicular relationship thereto. The grill panel 26 may be supported by the base frame elements 10. A frame interior 14 may be formed by and between the upright frame elements 11 of the side frame members 3, the rear frame member 4 and the front frame member 5. A frame opening 16 may be formed by and between the base frame elements 10 of the side frame members 3, the rear frame member 4 and the front frame member 5, with the frame opening 16 communicating with the frame interior 14. Accordingly, as it rests on the base frame elements 10, the grill panel 26 may separate the frame opening 16 from the frame interior 14, with the mesh openings 30 therein establishing communication therebetween.

Each frame securing assembly 18 may have any design and include any device, element, component or combination of devices, elements or components configured to facilitate secure and yet detachable securement of the insert assembly frame 2 to the bottom frame panel 50 of the fireplace frame 48 for cantilevered support of the insert assembly frame 2 in the fireplace interior 41 of the fireplace 40. Accordingly, in some embodiments, the fireplace grill insert assembly 18 may include at least one frame leg 20 which may extend downwardly from the rear frame member 4 of the insert assembly frame 2. In some embodiments, a pair of spaced-apart frame legs 20 may extend from the rear frame member 4, typically at the respective rear frame corners 6 of the insert assembly frame 2, as illustrated. Each frame leg 20 may have a proximal frame leg end 21 at the rear frame member 4 and a distal frame leg end 22 opposite the proximal frame leg end 21.

As illustrated in FIGS. 5-7, each frame securing assembly 18 may include at least one frame clip 65 supported by each frame leg 20. A frame space 24 may be formed by and between the frame leg 20 and each corresponding frame clip 65. As illustrated in FIGS. 6 and 7, the frame space 24 may be suitably sized and configured to receive the upper panel edge 53 on the bottom frame panel 50 of the fireplace frame 48.

As illustrated in FIGS. 1 and 8, an elongated frame leg slot 23 may extend through the frame leg 20 between the proximal frame leg end 21 and the distal frame leg end 22. The frame clip 65 may be positionally adjustable along the frame leg slot 23 according to the knowledge of those skilled in the art. Accordingly, the frame clip 65 may include a frame clip body 66. A clip flange 67 may extend from the frame clip body 66 in offset relationship with respect to the plane of the frame clip body 66. A threaded clip shank 68 may extend from the frame clip body 66. The clip shank 68 may be sized and configured for extension or insertion through the frame leg slot 23 in the frame leg 20. A securing nut 70, such as a wing nut, for example and without limitation, may threadably engage the clip shank 68. The nut 70 may be tightened against the frame leg 20 to secure the frame clip 65 at the selected height or position along the frame leg 20.

The grill panel 26 of the assembly 1 may be fabricated of steel, cast iron and/or other heat-absorbing material. The insert assembly frame 2, frame securing assemblies 18, insert assembly handle 34 and other components of the assembly 1 may be fabricated of aluminum, steel, iron and/or other heat-resistant material or materials known by those skilled in the art.

Figure 13:
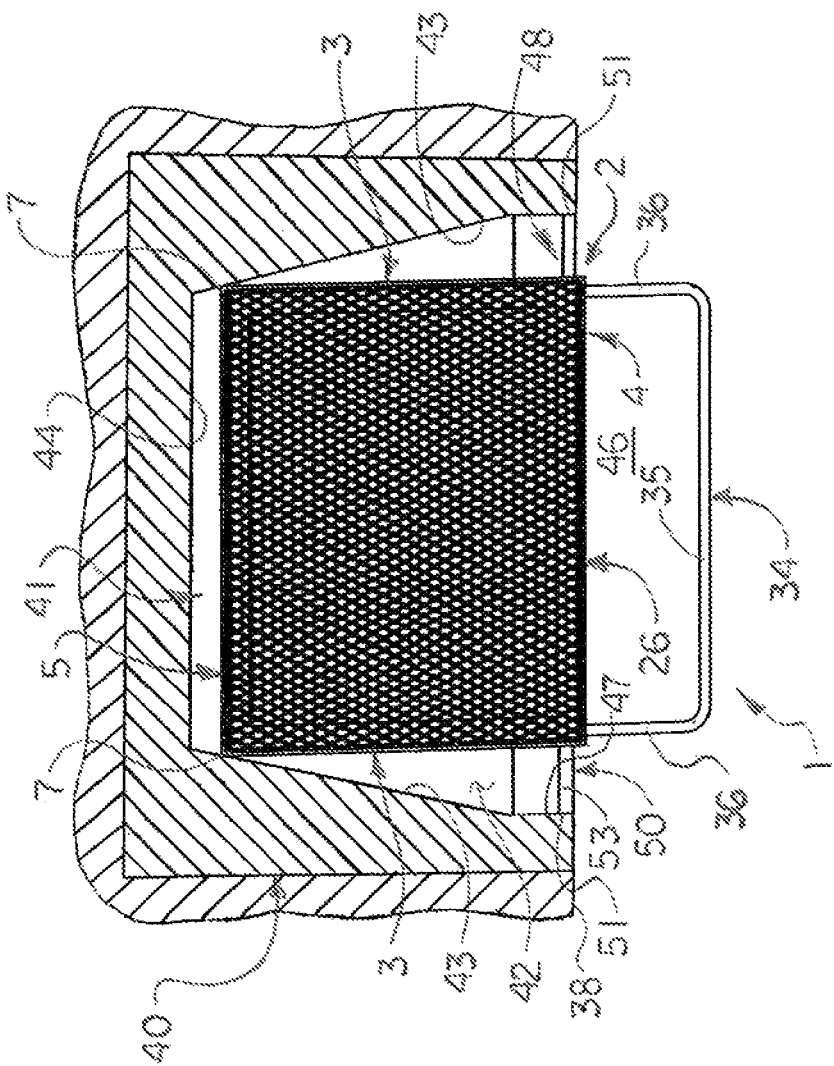
FIG. 13 is a top view of the illustrative fireplace grill insert assembly deployed in the fireplace illustrated in FIG. 12.

Referring again to FIGS. 11-14 of the drawings, in typical application, the assembly 1 may be removably deployed in the fireplace interior 41 of the fireplace 40 to support the food item or items 58 (FIG. 11) for grilling or cooking of the food items 58 over the fire 60 in the fireplace interior 41. Accordingly, the assembly 1 may be lifted and carried or maneuvered by grasping the insert assembly handle 34. The front frame member 5 on the insert assembly frame 2 of the assembly 1 may be inserted first through the front fireplace opening 47 and then into the fireplace interior 41 typically until the rear frame member 4 of the insert assembly frame 2 aligns or registers with the upper panel edge 53 on the bottom frame panel 50 of the fireplace frame 48. As illustrated in FIG. 13, in some applications, the front frame corners 7 of the insert assembly frame 2 may engage or be disposed proximate to the respective typically angled fireplace sidewalls 43 of the fireplace 40. The front frame member 5 of the insert assembly frame 2 may engage or be disposed proximate to the fireplace rear wall 44 of the fireplace 40.

The insert assembly frame 2 of the assembly 1 may be attached to the bottom frame panel 50 of the fireplace frame 48 typically by lowering the frame securing assemblies 18 over the bottom frame panel 50 until the frame space 24 (FIGS. 6 and 7) between the frame leg 20 and the clip flange 67 on the frame clip 65 of each corresponding frame securing assembly 18 receives the upper panel edge 53 of the bottom frame panel 50. The height or vertical position of the frame clip 65 on the frame leg 20, as well as the width of the frame space 24, may be selectively adjusted to accommodate the height and thickness, respectively, of the bottom frame panel 50. This may be accomplished by unthreading or threading the nut 70 on the clip shank 68 until the optimum fit of the bottom frame panel 50 in the frame space 24 is achieved. The nut 70 may be tightened against the frame leg 20 to securely mount the insert assembly frame 2 on the bottom frame panel 50. The frame securing assemblies 18 may thusly support the insert assembly frame 2 and the grill panel 26 thereon from the bottom frame panel 50 in a cantilever configuration over the fireplace floor 42 of the fireplace 40, typically as illustrated in FIG. 14.

The tire 60 may be kindled in the fireplace interior 41 by igniting kindling or wood and/or by burning pilot gas in the fireplace interior 41 beneath the insert assembly frame 2 and the grill panel 26, typically in the conventional manner. The food item or items 58 may be placed on the grill panel 26 as the grill panel 26 is heated over the fire 60 or as the fire 60 enters the frame interior 14 through the frame opening 16 and the expanded metal mesh openings 30 in the grill panel 26.

When cooking of the food items 58 is completed, the food items 58 may be removed from the grill panel 26 for consumption using tongs, a fork and/or other utensils suitable for the purpose (not illustrated). Alternatively, the assembly 1 may be selectively and easily removed from the fireplace interior 41 as the food items 58 remain thereon for subsequent removal of the cooked food items 58 from the assembly 1. This may be accomplished by lifting the insert assembly frame 2 to disengage the frame space 24 between the frame leg 20 and the frame clip 65 of each frame securing assembly 18 from the upper panel edge 53 on the bottom frame panel 50 of the fireplace frame 48. In some cases, the nut 70 may be loosened to enlarge the frame space 24. In some applications, the assembly 1 may remain in place in the fireplace interior 41 of the fireplace 40 between uses of the assembly 1.

Figure 18:
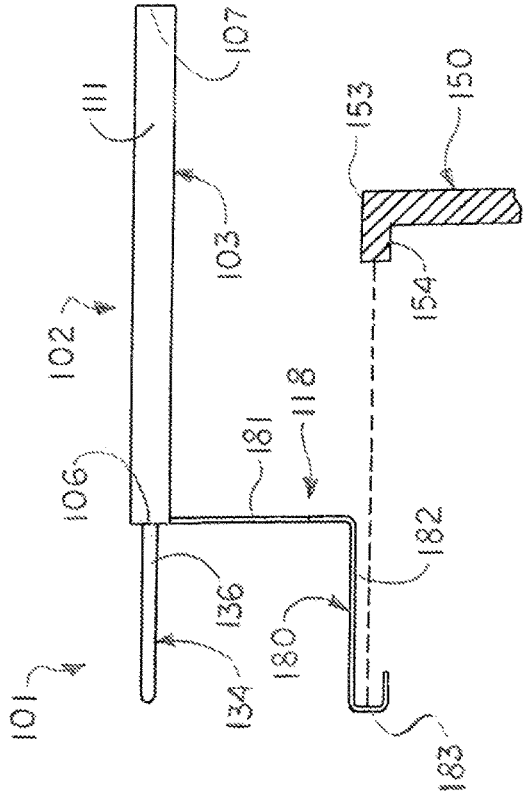
FIG. 18 is an exploded side view of the illustrative fireplace grill insert assembly illustrated in FIG. 15, more particularly illustrating typical mounting of the assembly on the bottom hearth panel via the alternative frame securing assembly.
Figure 19:
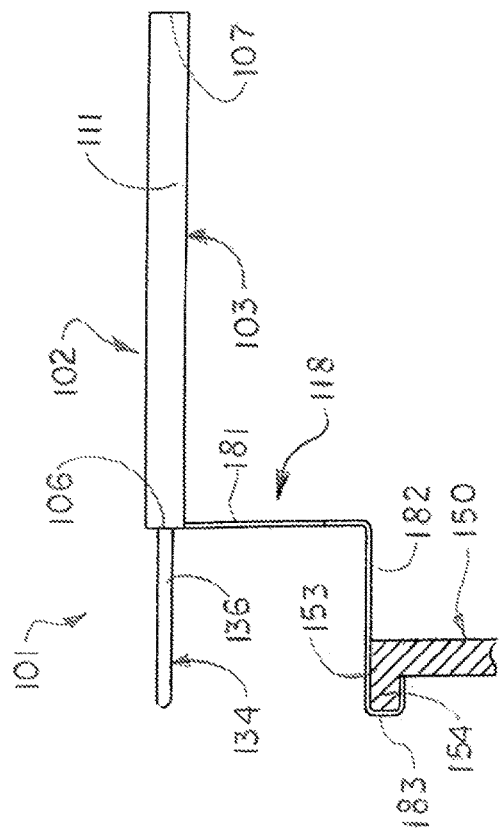
FIG. 19 is a side view of the illustrative fireplace grill insert assembly illustrated in FIG. 15, mounted on the bottom hearth panel of the fireplace via the frame securing assembly.

Referring next to FIGS. 15-20 of the drawings, an alternative illustrative embodiment of the fireplace grill insert assemblies is generally indicated by reference numeral 101. In the assembly 101, elements which are analogous to the respective elements of the assembly 1 that was heretofore described with respect to FIGS. 1-14 are designated by the same respective numerals in the 101-199 series in FIGS. 15-20. The assembly 1 may be configured to mount on a bottom frame panel 150 having an outer panel flange 154 which extends from the bottom frame panel 150 rearwardly away from the front fireplace opening 147 of the fireplace 140. Accordingly, each frame securing assembly 118 of the assembly 101 may include a frame leg 180. The frame leg 180 may include a proximal leg segment 181 which extends downwardly from the rear frame member 104 of the insert assembly frame 102. The proximal leg segment 181 may be disposed in perpendicular relationship to the plane of the insert assembly frame 102. A distal leg segment 182 may extend rearwardly from the proximal leg segment 181. The distal leg segment 182 may be oriented in perpendicular relationship to the proximal leg segment 181 and parallel to the plane of the insert assembly frame 102. A frame hook 183 may terminate the distal leg segment 182. As illustrated in FIGS. 18 and 19, the frame hook 183 may be configured to engage the panel flange 154 on the bottom frame panel 150 of the fireplace frame 148.

Figure 20:
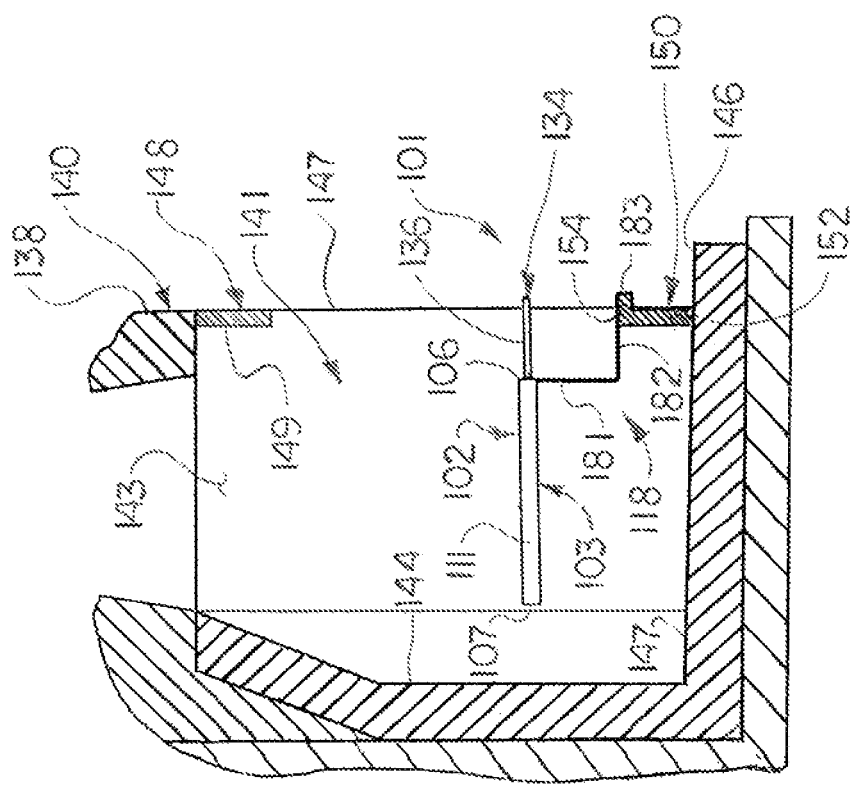
FIG. 20 is a side view of the illustrative fireplace grill insert assembly illustrated in FIG. 15, deployed in the fireplace (illustrated in section).

Application of the assembly 101 may be as was heretofore described with respect to the assembly 1 in FIGS. 1-14. As illustrated in FIG. 20, the frame hooks 183 on the respective frame legs 180 may be placed into engagement with the panel flange 154 on the bottom frame panel 150 of the fireplace frame 148 as the insert assembly frame 102 is inserted into the fireplace interior 141 of the fireplace 140. Accordingly, the frame legs 180 may support the insert assembly frame 102 and the grill panel 126 in a cantilevered configuration in the fireplace interior 41 of the fireplace 40 as food items 58 (FIG. 11) placed on the grill panel 126 are cooked over a fire 60 inside the fireplace interior 141. The assembly 101 may be selectively removed from the fireplace interior 141 of the fireplace 140 by initially pulling the assembly 1 rearwardly, typically by grasping and pulling the insert assembly handle 134, to disengage the frame hooks 183 on the respective frame legs 180 from the panel flange 154 on the bottom frame panel 150 of the fireplace frame 148. In some applications, the assembly 1 may remain in place in the fireplace interior 41 of the fireplace 40 between uses of the assembly 1.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A fireplace grill insert assembly suitable for deployment in a fireplace having a fireplace interior and a fireplace frame having a bottom frame panel in the fireplace interior, the fireplace grill insert assembly comprising:
   an insert assembly frame;
   at least one grill panel carried by the insert assembly frame;
   at least one frame securing assembly carried by the insert assembly frame, the at least one frame securing assembly configured to facilitate detachable securement of the insert assembly frame to the bottom frame panel of the fireplace frame and cantilevered support of the insert assembly frame in the fireplace interior of the fireplace; and
   wherein the at least one frame securing assembly comprises at least one frame leg extending from the insert assembly frame, at least one frame clip carried by the at least one frame leg and at least one frame space between the at least one frame leg and the at least one frame clip, the at least one frame space sized and configured to receive the bottom frame panel of the fireplace frame.

2. The fireplace grill insert assembly of claim 1 wherein the at least one grill panel comprises at least one expanded metal mesh panel.

3. The fireplace grill insert assembly of claim 1 further comprising at least one insert assembly handle extending from the insert assembly frame.

4. The fireplace grill insert assembly of claim 1 wherein the insert assembly frame comprises a rear frame member, a front frame member spaced-apart from the rear frame member and a pair of spaced-apart side frame members extending between the rear frame member and the front frame member, and the at least one frame securing assembly is carried by the rear frame member.

5. The fireplace grill insert assembly of claim 4 wherein each of the rear frame member, the front frame member and the side frame members of the insert assembly frame comprises a base frame element and an upright frame element extending from the base frame element, and the grill panel is supported by the base frame element.

6. The fireplace grill insert assembly of claim 1 further comprising an elongated frame leg slot in the at least one frame leg, and wherein the at least one frame clip is positionally adjustable along the frame leg slot.

7. The fireplace grill insert assembly of claim 6 wherein the at least one frame clip comprises a frame clip body adjustably engaging the frame leg slot in the at least one frame leg and a clip flange extending from the frame clip body, the clip flange offset with respect to the frame clip body.

8. The fireplace grill insert assembly of claim 1 wherein the insert assembly frame is rectangular.

9. The fireplace grill insert assembly of claim 1 wherein the at least one frame securing assembly comprises a pair of spaced-apart frame securing assemblies.

10. A fireplace grill insert assembly suitable for deployment in a fireplace having a fireplace interior and a fireplace frame having a bottom frame panel in the fireplace interior, the fireplace grill insert assembly comprising:
    an insert assembly frame;
    at least one grill panel carried by the insert assembly frame;
    at least one frame securing assembly carried by the insert assembly frame, the at least one frame securing assembly configured to facilitate detachable securement of the insert assembly frame to the bottom frame panel of the fireplace frame and cantilevered support of the insert assembly frame in the fireplace interior of the fireplace; and
    wherein the at least one frame securing assembly comprises at least one frame leg extending from the rear frame member of the insert assembly frame and a frame hook on the at least one frame leg, the frame hook configured to engage a panel flange on the bottom frame panel of the fireplace frame.

11. The fireplace grill insert assembly of claim 10 wherein the at least one frame leg comprises a proximal leg segment extending from the insert assembly frame and a distal leg segment extending rearwardly from the proximal leg segment, and the frame hook is carried by the distal leg segment.

12. A fireplace grill insert assembly suitable for deployment in a fireplace having a fireplace interior and a fireplace frame having a bottom frame panel in the fireplace interior, the fireplace grill insert assembly comprising:
    an insert assembly frame including:
       a rear frame member;
       a front frame member spaced-apart from the rear frame member;
       a pair of spaced-apart side frame members extending between the front frame member and the rear frame member; and
       a frame interior formed by and between the rear frame member, the front frame member and the pair of spaced-apart side frame members;
    at least one grill panel carried by the rear frame member, the front frame member and the side frame members and disposed in the frame interior of the insert assembly frame;
    at least one frame securing assembly carried by the rear frame member of the insert assembly frame, the at least one frame securing assembly configured to facilitate detachable securement of the insert assembly frame to the bottom frame panel of the fireplace frame and cantilevered support of the insert assembly frame in the fireplace interior of the fireplace; and
    wherein the at least one frame securing assembly comprises at least one frame leg extending from the rear frame member of the insert assembly frame, at least one frame clip carried by the at least one frame leg and at least one clip space between the at least one frame leg and the at least one frame clip, the at least one frame space sized and configured to receive the bottom frame panel of the fireplace frame.

13. The fireplace grill insert assembly of claim 12 further comprising an elongated frame leg slot in the at least one frame leg, and wherein the at least one frame clip comprises a frame clip body, a clip flange extending from the frame clip body and offset with respect to the frame clip body, a clip shank extending from the frame clip body and sized and configured for extension through the frame leg slot and a nut threadably engaging the clip shank.

14. A fireplace grill insert assembly suitable for deployment in a fireplace having a fireplace interior and a fireplace frame having a bottom frame panel in the fireplace interior, the fireplace grill insert assembly comprising:
   an insert assembly frame including:
      a rear frame member;
      a front frame member spaced-apart from the rear frame member;
      a pair of spaced-apart side frame members extending between the front frame member and the rear frame member; and
      a frame interior formed by and between the rear frame member, the front frame member and the pair of spaced-apart side frame members;
   at least one grill panel carried by the rear frame member, the front frame member and the side frame members and disposed in the frame interior of the insert assembly frame; and
   at least one frame securing assembly carried by the rear frame member of the insert assembly frame, the at least one frame securing assembly configured to facilitate detachable securement of the insert assembly frame to the bottom frame panel of the fireplace frame and cantilevered support of the insert assembly frame in the fireplace interior of the fireplace; and
   wherein the at least one frame securing assembly comprises at least one frame leg comprising a proximal leg segment extending from the rear frame member of the insert assembly frame, a distal leg segment extending rearwardly from the proximal leg segment and a frame hook carried by the distal leg segment, the frame hook configured to engage a panel flange on the bottom frame panel of the fireplace frame.

15. A fireplace grill insert assembly suitable for deployment in a fireplace having a fireplace floor, a pair of spaced-apart fireplace sidewalls extending from the fireplace floor, a fireplace rear wall extending from the fireplace floor between the fireplace sidewalls, a fireplace interior with a front fireplace opening, and a fireplace frame having a bottom frame panel extending between the fireplace sidewalls at the front fireplace opening, the fireplace grill insert assembly comprising:
   a rectangular insert assembly frame comprising:
      an elongated rear frame member;
      an elongated front frame member spaced-apart from the rear frame member;
      a pair of elongated, spaced-apart side frame members extending between the front frame member and the rear frame member, each of the rear frame member, the front frame member and the side frame members having an L-shaped cross-section with a base frame element and an upright frame element perpendicular to the base frame element;
      a frame interior formed by and between the upright frame element of the rear frame member, the front frame member and the side frame members; and
      a frame opening formed by and between the base frame element of the rear frame member, the front frame member and the side frame members, the frame opening communicating with the frame interior;
   at least one grill panel carried by the base frame element of the rear frame member, the front frame member and the side frame members, the at least one grill panel disposed in the frame interior of the insert assembly frame at the frame opening;
   at least one insert assembly handle carried by the rear frame member of the insert assembly frame;
   at least one frame securing assembly carried by the rear frame member of the insert assembly frame, the at least one frame securing assembly configured to facilitate detachable securement of the insert assembly frame to the bottom frame panel of the fireplace frame and cantilevered support of the insert assembly frame in the fireplace interior of the fireplace; and
   wherein the at least one frame securing assembly comprises at least one frame leg extending from the rear frame member of the insert assembly frame, at least one frame clip carried by the at least one frame leg and at least one frame space between the at least one frame leg and the at least one frame clip, the at least one frame space sized and configured to receive the bottom frame panel of the fireplace frame.

16. The fireplace grill insert assembly of claim 15 further comprising an elongated frame leg slot in the at least one frame leg, and wherein the at least one frame clip comprises a frame clip body, a clip flange extending from the frame clip body and offset with respect to the frame clip body, a clip shank extending from the frame clip body and sized and configured for extension through the frame leg slot and a nut threadably engaging the clip shank.

17. A fireplace rill insert assembly suitable for deployment in a fireplace having a fireplace floor, a pair of spaced-apart fireplace sidewalls extending from the fireplace floor, a fireplace rear wall extending from the fireplace floor between the fireplace sidewalls, a fireplace interior with a front fireplace opening, and a fireplace frame having a bottom frame panel extending between the fireplace sidewalls at the front fireplace opening, the fireplace grill insert assembly comprising:
   a rectangular insert assembly frame comprising:
      an elongated rear frame member;
      an elongated front frame member spaced-apart from the rear frame member;
      a pair of elongated, spaced-apart side frame members extending between the front frame member and the rear frame member, each of the rear frame member, the front frame member and the side frame members having an L-shaped cross-section with a base frame element and an upright frame element perpendicular to the base frame element;
      a frame interior formed by and between the upright frame element of the rear frame member, the front frame member and the side frame members; and
      a frame opening formed by and between the base frame element of the rear frame member, the front frame member and the side frame members, the frame opening communicating with the frame interior;
   at least one rill panel carried by the base frame element of the rear frame member, the front frame member and the side frame members, the at least one grill panel disposed in the frame interior of the insert assembly frame at the frame opening;
   at least one insert assembly handle carried by the rear frame member of the insert assembly frame;
   at least one frame securing assembly carried by the rear frame member of the insert assembly frame, the at least one frame securing assembly configured to facilitate detachable securement of the insert assembly frame to the bottom frame panel of the fireplace frame and cantilevered support of the insert assembly frame in the fireplace interior of the fireplace; and wherein the at least one frame securing assembly comprises at least one frame leg extending from the rear frame member of the insert assembly frame, the at least one frame leg comprising a proximal leg segment extending from the rear frame member of the insert assembly frame; a distal leg segment extending rearwardly from the proximal leg segment; and a frame hook carried by the distal leg segment, the frame hook configured to engage a panel flange on the bottom frame panel of the fireplace frame.

* * * * *